United States Patent [19]

Klein

[11] 4,133,803

[45] Jan. 9, 1979

[54] POLYOXYPROPYLENE POLYAMINE POLYAMIDE THERMOPLASTIC ADHESIVES

[75] Inventor: Howard P. Klein, Austin, Tex.

[73] Assignee: Texaco Development Corp., New York, N.Y.

[21] Appl. No.: 734,068

[22] Filed: Oct. 20, 1976

Related U.S. Application Data

[63] Continuation-in-part of Ser. No. 622,311, Oct. 14, 1975, abandoned.

[51] Int. Cl.$^2$ .............................................. C08G 69/26
[52] U.S. Cl. ................................. 528/340; 260/30.8 R; 260/31.8 N; 260/33.4 R; 260/37 N; 260/830 P; 528/343; 528/347; 528/335
[58] Field of Search ......................... 260/78 R, 78 TF

[56] References Cited

U.S. PATENT DOCUMENTS

| | | | |
|---|---|---|---|
| 3,499,853 | 3/1970 | Griebsch et al. | 260/18 N |
| 3,882,090 | 5/1975 | Fagerburg et al. | 260/78 R |

Primary Examiner—Harold D. Anderson
Attorney, Agent, or Firm—Carl G. Ries; Thomas H. Whaley; James L. Bailey

[57] ABSTRACT

A novel thermoplastic adhesive having a melting point between about 20° C to about 180° C. is disclosed which is comprised of a resinous polyamide reaction product of a polyoxypropylene polyamine selected from diamines, triamines, or mixtures thereof having an average molecular weight of about 190 to about 3,000 and an aliphatic or aromatic dicarboxylic acid, ester or anhydride. The thermoplastic adhesive of the invention is prepared by mixing and reacting the polyoxypropylene polyamine and the dicarboxylic acid, ester or anhydride at a molar ratio of from about 0.25:1 to about 4.0:1 at a temperature of from about 175° to about 270° C. for about 1 to about 12 hours. Other components, e.g., a minor amount of polyepoxide resin having an epoxide equivalent weight of about 150 to about 600, a compatible plasticizing agent, filler and the like, may be added to the polyamide reaction product to provide a formulated thermoplastic adhesive having a broad range of hardness, flexibility and compatibility, and capable of bonding together a variety of substrates.

7 Claims, No Drawings

POLYOXYPROPYLENE POLYAMINE POLYAMIDE THERMOPLASTIC ADHESIVES

CROSS-REFERENCE TO RELATED APPLICATION

This application is a continuation-in-part of co-pending U.S. Pat. application, Ser. No. 622,311, filed Oct. 14, 1975, now abandoned.

BACKGROUND OF THE INVENTION

This invention relates to a thermoplastic adhesive and more particularly pertains to a novel thermoplastic adhesive comprised of a polyamide reaction product, prepared from relatively inexpensive and readily available synthetic materials, having a broad range of melting temperatures and adhesive properties.

DESCRIPTION OF THE PRIOR ART

The utilization of polyamide reaction products of certain aliphatic polyamines and vegetable or animal-based dimer or trimer fatty acids as thermoplastic or hot-melt adhesives for the bonding of a multitude of materials, such as leather, textiles, wood, and the like, is well-known as shown by U.S. Pat. No. 2,969,555 to Kamborian. Generally, such thermoplastic adhesives are prepared by the condensation reaction of aliphatic polyamines, e.g. polyethylene polyamines such as ethylenediamine, diethylenetriamine, hexamethylene diamine, and other related aliphatic polyamines, and a polymerized polyene fatty acid, ester or anhydride prepared by the thermal polymerization of fatty oils containing glycerides of polymerizable fatty acids such as soybean oil, linseed oil, cottonseed oil, castor oil, and the like. The polyamide reaction products are prepared by heating such admixtures at temperatures which readily produce polyaminolysis of the fatty esters or dehydration of the polyamine salts of the fatty acids, as described in U.S. Pat. No. 2,450,940 to Cowan et al.

U.S. Pat. No. 2,867,592 to Morris, et al describes an improved thermoplastic adhesive for use in rod form which contains an admixture of a polyamide reaction product of an alkylene polyamine and a polymerized fatty acid, ester or anhydride and a minor amount of a resinous polyepoxide. Patentees disclose that the addition of the resinous polyepoxide increases the dimensional stability and strength of the thermoplastic adhesive during preparation and use.

However, vegetable or animal-base dimer and trimer fatty acid materials usually employed in the preparation of polyamide-based thermoplastic adhesives are in increasing short supply and are continuously increasing in price. Moreover, the aliphatic polyamine compounds mentioned hereinabove are also used in great quantities as curing agents for polyepoxide resins, thus making them more unobtainable.

Driven by the need for satisfactory replacement for these naturally derived materials, we have now discovered a novel thermoplastic adhesive formulation which can be prepared from synthetic materials that are more economical and readily available than those heretofore employed and mentioned hereinbefore. Moreover, surprisingly, the thermoplastic adhesive compounds of the present invention exhibit broad ranges of hardness, flexibility and compatibility, as well as a broad range of melt temperatures and are capable of bonding together a wide variety of materials. These novel adhesives are capable of being combined with other components, e.g. polyepoxide resins, plasticizers, filler, etc., to provide tailored adhesive systems having specifically desired properties.

SUMMARY OF THE INVENTION

Accordingly, the present invention is a novel thermoplastic adhesive compound comprising a resinous polyamide reaction product of a polyoxyalkylene polyamine selected from diamines, triamines and mixtures thereof having an average molecular weight of from about 190 to about 3,000 and an aliphatic or aromatic dicarboxylic acid, ester or anhydride having about 2 to about 30 carbon atoms per molecule. The thermoplastic adhesive compounds of the invention are prepared by mixing and reacting the aforementioned polyoxyalkylene polyamine and dicarboxylic acid, ester or anhydride in a molar ratio of from about 0.25:1.0 to about 4.0:1.0 at a temperature within the range of from about 175° C. to about 270° C. for a time period of from about 1 to about 12 hours. The resulting polyamide reaction product has a melting point within the range of about 20° C. to about 180° C. and exhibits physical characteristics of hardness, flexibility substantially comparable to polyamide reaction products described hereinbefore as conventionally employed as thermoplastic adhesives. Moreover, the thermoplastic adhesive compounds of the invention can be mixed with a minor amount of a polyepoxide, e.g., a polyglycidyl ether of a polyhydric phenol having an epoxide equivalent weight of about 150 to about 600, as well as compatible plasticizing agents, fillers, and the like to produce formulated thermoplastic adhesive compositions of specifically desired physical characteristics which are capable of bonding a variety of substrates.

Polyamide reaction products of certain polyamines, e.g, the ethyleneamines, and short-chain aliphatic or aromatic dicarboxylic acids, esters and anhydrides are known in the art. However, such polyamide reaction products ordinarily exhibit excessively high rigidity and high melting points and have thus, heretofore not been considered useful as thermoplastic adhesives, particularly in thermoplastic adhesive formulations with other components such as polyepoxide resins.

Surprisingly, we have discovered that, by the use of the above-mentioned polyoxypropylene polyamines in a condensation reaction with short-chain dicarboxylic acids and related materials result in the production of resinous polyamides with a broad range of hardness, flexibility and compatibility which can be successfully employed as thermoplastic adhesives having comparable physical and adhesive and bonding properties to conventional thermoplastic adhesives prepared from the polyamide reaction product of polyamines such as ethyleneamines and vegetable or animal-based dimer or timer fatty acids. The present invention thus eliminates the need for employing vegetable or animal-based dimer or trimer fatty acids which are usually in short supply in the market place and continuously increasing in price for the preparation of thermoplastic adhesives.

DETAILED DESCRIPTION OF THE INVENTION

Polyoxypropylene polyamines, and procedures for their preparation, useful in producing the thermoplastic adhesives of the invention are well-known and amply described in the literature. See, for example, U.S. Pat. No. 3,654,370.

Polyoxypropylene polyamines are known to be particularly useful as curing agents for polyepoxide resins as illustrated in U.S. Pat. No. 3,462,393. Surprisingly, we have now discovered that these polyamine materials, when used in the preparation of the polyamide reaction product of the present invention, produce new and unexpected hot-melt adhesives.

Preferably, we employ polyoxypropylene diamines of the formula:

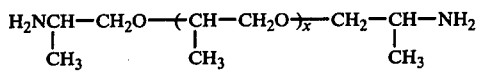

wherein x is an integer of from about 1 to 40, and polyoxypropylene triamines of the formula:

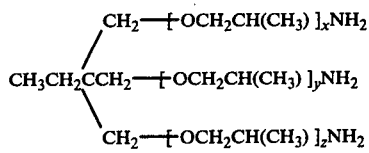

where x, y and z represents integers in the range of about 1 to 15, and the sum of x, y and z is from 3 to about 50. The preferred polyoxypropylene diamines of the formula have average molecular weights between about 190, where x is an average of 1.0 to about 2,000 where x is an average of about formula have average molecular weights between about 200 to about 3,000. These polyoxypropylene di-and triamines are readily available commercially in a wide variety of molecular weight ranges, such as those sold by Jefferson Chemical Company, Inc., Houston, Tex., under the trandemark JEFFAMINE ®.

The above described polyoxyalkylene polyamines can be reacted with any known aliphatic or aromatic dicarboxylic acid, ester or anhydride compound having from about 2 to about 20 carbon atoms in the preparation of the thermoplastic adhesive composition of the present invention. Hereafter, these acids and related materials will be referred to as dibasic acid compounds. Unexpectedly, we have found that these relatively inexpensive and readily available dibasic acids react easily with the described polyoxypropylene polyamines to provide the unexpected hot-melt adhesives of the invention. The preferred aliphatic dibasic acids have a divalent, saturated, unsubstituted hydrocarbon group, while the preferred aromatic dibasic acids include an unsubstituted phenylene group. Examples of preferred dibasic acids, anhydrides and esters include oxalic, adipic, azelaic, sebacic, isophthalic, and terephthalic acids, phthalic and succinic anhydrides, and dimethylterephthalate esters, to name a few.

More particularly, the polyamide reaction product of the present invention is prepared by mixing and reacting one or more of the above-described dibasic acids at a temperature of between about 175° C. to about 270° C., preferably from about 220° C. to about 260° C. The amine and acid compounds are preferably mixed in amine:acid molar ratios of from about 0.8:1.0 to about 1.25:1.0 with substantially equimolar ratios being especially preferred. The admixture is usually heated for several hours, i.e., from about 1 to about 12 hours, to complete the reaction while by-product water or alcohol, depending upon the compounds employed, is removed. Preferably, the reaction mixture is vacuum stripped to develop optimum molecular weight.

If desirable, an additional polyamine compound, such as a (poly)ethylene polyamine, can be added with the above-described polyoxyalkylene polyamines to prepare the polyamide reaction product of the invention. In this embodiment, a (poly) ethylene polyamine can be employed in an amount up to about 50 weight percent, preferably about 10 to 25 weight percent, based upon the total weight of materials employed. Accordingly, the amount of polyoxyalkylene polyamine employed is reduced to provide the above-described molar ratios of amine-dibasic acid. Unexpectedly such compositions do not have excessive rigidity and high melting points which are characteristic of like compositions prepared by employing (poly) ethylene polyamines, especially ethylene-diamine alone. (Poly) ethylene polyamines useful in this embodiment of the invention are those having the formula:

where x is 0 to 4. Examples of preferred (poly) ethylene polyamines include ethylenediamine, diethylenetriamine, triethylenetetramine and the like with ethylenediamine being especially preferred.

Preferably, a polyepoxide resin in admixed with the resulting resinous polyamine reaction product of the invention in an amount of about 1 to about 25 weight percent, based upon the total admixture weight, at a temperature above the melting points of each component, e.g. within the range of about 20° C. to about 180° C. The polyepoxide resin component used is well-known in preparing thermoplastic adhesives. Such polyepoxides are well-known complex resinous materials and are generally prepared by the reaction of polyhydric organic compounds with a chlorohydrin. References which describe in detail methods of preparing the epoxide resins of the type concerned here include "Epoxy Resins," by Lee and Neville, McGraw-Hill Book Company, Inc. (1957), and "Epoxy Resins," by Irving Skeist, Reinhold Publishing Company (1958). The preferred polyepoxide resins are the polyglycidyl ethers of polyhydric phenols, such as the diglycidyl ether of resorcinol, the triglycidyl ether of phloroglucinol, the tetraglycidyl ether of tetraphenylolethane or the polyglycidyl ether of a phenolformaldehyde novolac. Especially preferred is the diglycidyl ether of 4,4'-isopropylidenediphenol, generally known as bis-phenol A, containing a minor amount of cogeneric materials of higher molecular weight and having an epoxide equivalent weight (gramsof resin containing one equivalent epoxide) of approximately 150 to about 600.

The polyamide reaction product composition of the invention will normally contain several unreacted amine and carboxyl groups. It is believed that these unreacted groups react with the epoxy group of the subsequently added poly epoxide resin and enhances the desired physical thermoplastic properties. Thus, preferably, the polyamide reaction product component will contain a total amine content of about 0.1 to about 2.0 meq./g. and will have an acid number of between about 2 to about 20. The total amine content and acid number can be readily determined by well-known analytical procedures.

Preferably, the polyepoxide resin component is added to the polyamide reaction product composition in an amount of from about 5 to about 25 weight percent based upon the total weight of the admixture. The specific amount employed is dependent upon the epoxide equivalent amount employed is dependent upon the epoxide equivalent weight of the polyepoxide resin, the total amine content and acid number of the polyamide reaction product and should be an amount which will not produce gelation. The specific amount for given components can be readily determined by one having ordinary skill in the art with only minor experimentation, such as that described in U.S. Pat. No. 2,867,592 to Morris et al, Jan. 6, 1959, which is incorporated herein by reference. The experimentation described components containing varying amounts of polyepoxide resin to 150° C. in 1-inch glass tubes and dropping a 3/16 inch steel ball therein. Gelation is defined therein as the state whereby the steel ball will fall or will not fall regularly through the resinous components.

In an especially preferred embodiment of the invention, a diglycidyl ether of bis-phenol A having an epoxide equivalent weight of about 175 to 190 is added to the above-described polyamide reaction product in an amount of about 5 to about 25 weight percent, based upon total formulation weight while the resinous polyamide component is heated at about 100° to about 130° C. Upon cooling, the resulting compound does not exhibit gelation and has a melting point between about 100° C. to about 180° C., depending upon the compounds employed in the preparation of the resinous polyamide reaction product component.

If desirable, a compatible plasticizer can be employed in the preparation of the inventive thermoplastic adhesives. Preferably, compatible plasticizers are added in an amount of between about 10 to about 40 weight percent with about 10 to about 30 weight percent being optimum. Examples of compatible plasticizers include toluene sulfonamides, dibutyl phthalate, short chain polyfunctional polyols and the like. The use of compatible plasticizers in thermoplastic adhesive formulations is well known and thus will not be discussed more particularly herein.

Moreover, compatible fillers can be employed if desired in amounts from 0 up to about 40 weight percent without reducing the adhesive properties or other physical characteristics of the inventive compound. In fact, compatible fillers have been found to increase the adhesion bond when the adhesive compounds are applied to certain substrates by reducing thermal expansion thus reducing strain during curing of the systems. Examples of compatible fillers include fumed silica, calcium carbonate, kaolin clays, alumina or titanium oxide, etc.

The following examples illustrate the invention in more detail, but are not to be construed as limitative. JEFFAMINE is the registered trademark for polyoxypropylene di- and triamines sold by Jefferson Chemical Company, Inc., Houston, Texas.

EXAMPLE I

To a suitable reaction vessel equipped with stirring means and heating means, were charged 584 grams of a polyoxypropylene diamine having an average molecular weight of 230 (JEFFAMINE D230, Jefferson Chemical Company, Inc., Houston, Texas) and 416 g isophthalic acid. The molar ratio of the admixture was 1.01:1.0 amine:acid. The admixture was heated and stirred at a temperature of 200°-240° C. for 7 hours with continuous removal of water. The reaction mixture was vacuum stripped during the last stages of heating to develop the optimum molecular weight. To 100 parts by weight of the resulting polyamide reaction product, heated at 140° C., were added the following components on a part by weight (pbw) basis:

15 pbw liquid epoxy resin (diglycidyl ether or bisphenol A, epoxide equivalent weight of 182-189);

45 pbw mixed N-ethyl, o-, p-toluenesulfonamides (Santicizer 8, Monsanto Chemical Company, St. Louis, Missouri);

1.5 pbw fumed silica (Cab-o-sil ® fumed silica, Cabot Corp.);

0.3 pbw of 0.0035 inch diameter glass beads

Portions of the formulation were then applied between various substrates and allowed to solidify. The tensile shear strength and peel strength of the formulation were then tested in accordance with ASTM D1002 and ASTM D903. Test results and description of substrates employed are set forth in the following Table 1:

TABLE I

| Substrate | Tensile Shear Strength, psi (ASTM D1002) | 180° Peel Strength psi (ASTM D903) |
|---|---|---|
| Aluminum to aluminum | 1520±50 | |
| Steel-to-steel | 2360±340 | |
| *Laminate-to-laminate | 780±60 | |
| Wood-to-wood | 300±40 | |
| Canvas-to-wood | | 18±3 |
| Canvas-to-laminate | | 29±3 |

*Formica ® phenolic laminate, American Cyanamid Co.

As illustrated in the above Table 1, the thermoplastic adhesive of the present invention can be formulated to provide thermoplastic adhesives exhibiting good adhesion properties.

EXAMPLE II-V

In order to demonstrate the unexpected results obtained by the termoplastic adhesive compounds of the present invention, four polyamide reaction product compounds and four thermoplastic adhesive formulations formulated therewith were prepared in accordance with the procedures described in EXAMPLE I utilizing the compounds in the amounts set forth in the following Table 2. As shown, the polyamide compound of EXAMPLE II was produced by the reaction of ethylenediamine and isophthalic acid while those of EXAMPLES III and IV were prepared by the reaction of ethylenediamine, a polyoxypropylene diamine having a molecular weight of 230 and isphthalic acid. The polyamide reaction product compound of EXAMPLE V was prepared by the reaction of the polyoxypropylene diamine and isphthalic acid only. The respective adhesive formulations are based upon parts by weight.

TABLE 2

| Example No. | II. | III. | IV. | V. |
|---|---|---|---|---|
| Polyamide composition (moles) | | | | |
| Ethylenediamine | 1.02 | 0.50 | 0.30 | — |
| Polyoxypropylene (1) diamine | — | 0.52 | 0.72 | 1.01 |
| Isophthalic acid | 1.00 | 1.00 | 1.00 | 1.00 |
| Adhesive formulation (pbw) | | | | |
| Polyamide | 20 | 20 | 20 | 20 |
| N-Ethyl toluene-sulfonamide | 6-12 | 15 | 15 | 9 |
| Epoxy resin (2) | 3 | 3 | 3 | 3 |
| Tensile shear strength psi (ASTM D1002) Bond: Aluminum-to-Aluminum | (3) | 1400±50 | 1010±65 | 1520±50 |

(1)JEFFAMINE ® D-230, a polyoxypropylene diamine having a molecular weight of 230, Jefferson Chemical Co., Inc.
(2) Diglycidyl ether of bis-phenol A having an epoxide equivalent weight of 190.
(3) Homogeneous system was not obtained - polyamide could not be solubilized.

As shown, the polyamide reaction product of ethylenediamine and isophthalic acid, EXAMPLE II, could not be combined with conventional thermoplastic adhesive additives for a satisfactory hot-melt adhesive formulation. The resulting polyamide composition of EXAMPLE II had too high a melting point to be of any value. On the other hand, the results of EXAMPLES III-V show the adhesive compositions of the invention have good adhesive strengths even when prepared by the employment of ethylenediamine in combination with the polyoxypropylene diamine.

EXAMPLES VI-IX

In order to further demonstrate the unexpected results obtained by the employment of the invented compositions, four additional thermoplastic adhesive formulations were prepared utilizing the compounds in the amounts set forth in the following Table 3. The polyamide reaction product compositions of Table 3 were prepared by combining the described amine components with isophthalic acid in the described molar ratios in accordance with the procedure described in EXAMPLE I. The polyamide reaction product compositions of EXAMPLES VII, VIII and IX were substantially the same as those of EXAMPLES I, III, IV and V except that the amine employed in VII-IX was a polyoxypropylene diamine having a molecular weight of 400 (JEFFAMINE ® D400, Jefferson Chemical Company, Inc.).

TABLE 3

| Example No. | VI. | VII. | VIII. | IX. |
|---|---|---|---|---|
| Polyamide composition (moles) | | | | |
| Ethylenediamine | 1.02 | 0.50 | 0.32 | — |
| Polyoxypropylene (1) diamine | — | 0.52 | 0.70 | 1.0 |
| Isophthalic acid | 1.00 | 1.00 | 1.00 | 1.00 |
| Adhesive formulation (parts by weight) | | | | |
| Polyamide | 20 | 20 | 20 | 20 |
| N-Ethyl toluene sulfonamide | 6-12 | 3 | 1 | 2 |
| Epoxy resin (2) | 3 | 3 | 3 | 3 |
| Tensile shear strength, psi, (ASTM D-1002) | | | | |
| Bond: Aluminum-to-Aluminum | (3) | 3160±170 | 2870±140 | 510±40 |

(1) JEFFAMINE ® D-400, a polyoxypropylene diamine having a molecular weight of 400, Jefferson Chemical Co., Inc.
(2) Diglycidyl ether of bis-phenol A, epoxide equivalent weight of 190.
(3) Homogeneous system was not obtained - polyamide could not be solubilized.

The results of EXAMPLE VI confirm the results obtained in EXAMPLE II. The polyamide composition of EXAMPLE VI also had too high a melting point to be successfully employed. EXAMPLES VII, VIII and IX confirm the results of EXAMPLES III, IV and V, employing a polyoxypropylene diamine having a higher molecular weight.

EXAMPLE X

To a 500 ml., 3-necked flask, fitted with a stirrer, thermometer, distilling head and nitrogen inlet was added 73 g. (0.50 mole) of adipic acid. To this was added 96.8 g. (0.510 mole) of tripropylene glycol diamine (JEFFAMINE ® D190 polyoxypropylene diamine having a molecular weight of 190, Jefferson Chemical Company, Inc.). The initial slurry was heated up under nitrogen and became a homogeneous clear liquid at 100° C. The temperature was gradually increased to 150-160° C., whereby water began to distill away from the reaction mass. At a temperature of 230° C. the reaction was a viscous, clear liquid and most of the water had been removed. High vacuum was then applied to the system, and the remaining condensation carried out at 235° C. for two hours. The resulting viscous, light yellow polymer could be poured while hot.

Weak, resilient fibers could be pulled from the melted liquid. When cool, the polymer was a hard, non-tacky solid, that completely dissolved in water. The polymer had a crystalline softening point of about 65° C. and formed a strong adhesive when melted and allowed to cool between glass plates. The polymer had an average molecular weight of 3685, as determined by osmometry and a reduced viscosity of 0.173 in methanol. Anal:% N calc = 9.33; % N found = 9.02.

EXAMPLE XI

To the apparatus described in Example X was added 95.5 g. (0.505 mole) of the diamine of Example X. The stirrer was set in motion and the flask filled with nitrogen. Thereafter, 73.0 g. (0.50 mole) of diethyl oxalate was added. An exothermic reaction occurred and mixture reached a maximum temperature of 95° C. without external heat. Heat was applied and ethanol began to distill off. The pot temperature rose slowly to 220° C., at which time most of the condensation was complete and the product was a thick, light yellow liquid. High vacuum (5 mm.) was applied at 265° C. for 30 minutes while the polymer slowly darkened. The brown polymer was poured into molds where it hardened to a nontacky, transparent solid, that softened in the 80-100° C. range and was only slightly changed after sitting under water overnight. The polymer softened in boiling water, but returned to its original form when cool. The reduced viscosity in dimethyl formamide was 0.22. Anal.:% N calc = 11.47; % N found = 11.24.

EXAMPLE XII

To the apparatus described in Example X was added 101 g. (0.5 mole) of sebacic acid and 95 g. (0.5 mole) of the diamine of Example X. The reactants were stirred for one hour and a viscous mass resulted. Heat was then applied to facilitate the condensation. At 150° C., a clear distillate began to distill over. The temperature gradually rose to 240-270° C., whereupon the reaction mixture was maintained at this temperature for one hour. After heating, the reaction mixture at this time was a viscous yellow liquid. The liquid was poured into molds where it cooled to a tough, flexible solid. Fibers could be pulled from the melt. The polymer was soluble in acetone and alcohol and was somewhat sensitive to water. The intrinsic viscosity was 0.257 (0.5 g./100 ml. MeOH at 25° C.). Anal.:% N calc. = 7.87; % N found = 7.75.

Obviously, many modifications and variations of the invention as hereinbefore set forth may be made without departing from the spirit and scope thereof and, therefore, only such limitations should be imposed as are indicated in the claims.

I claim:

1. A thermoplastic adhesive consisting essentially of a polyamide reaction product of a polyoxypropylene polyamine having an average molecular weight of about 190-3000, and having a structural formula as follows:

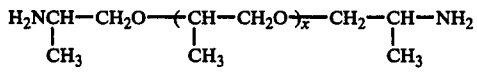

wherein x is an integerr from 1 to 40 or

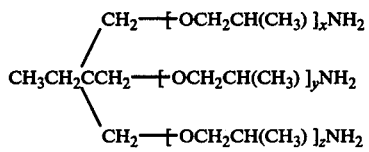

where x, y and z represent integers in the range of about 1 to 15, and the sum of x, y and z is from 3 to about 50; and an aliphatic or aromatic hydrocarbon dicarboxylic acid, ester or anhydride having from 2 to 30 carbon atoms, said polyamide reaction product being prepared by mixing and reacting said polyoxypropylene polyamine and said carboxylic acid, ester or anhydride at a temperature of from about 175° C. to about 270° C.

2. The thermoplastic adhesive of claim 1 wherein said dicarboxylic acid, ester or anhydride is selected from the group consisting of isophthalic acid, dimethyl terephthalate, terephthalic acid, and phthalic anhydride.

3. The thermoplastic adhesive of claim 1 wherein said polyamide reaction product is the reaction product of said polyoxypropylene polyamine, said dicarboxylic acid, ester or anhydride, and a polyethylene polyamine of the formula:

where x is 0 to 4, said polyethylene polyamine being employed in an amount of about 10 to about 50 weight percent based upon the total weight of the polyamide reaction product.

4. The thermoplastic adhesive of claim 3 wherein said polyethylene polyamine is ethylenediamine.

5. The thermoplastic adhesive of claim 1 wherein the ratio of said polyoxypropylene polyamine to said dicarboxylic acid, ester or anhydride is about 1:1.

6. The thermoplastic adhesive compound of claim 1 wherein said compound includes a compatible plasticizing agent.

7. The thermoplastic adhesive compound of claim 1 wherein said compound further includes a compatible filler.

* * * * *